(12) United States Patent
Zamanian

(10) Patent No.: US 11,030,914 B2
(45) Date of Patent: Jun. 8, 2021

(54) LEARNING DEVICE AND METHOD

(71) Applicant: Hossein Zamanian, Dallas, TX (US)

(72) Inventor: Hossein Zamanian, Dallas, TX (US)

(*) Notice: Subject to any disclaimer, the term of this patent is extended or adjusted under 35 U.S.C. 154(b) by 4 days.

(21) Appl. No.: 16/549,993

(22) Filed: Aug. 23, 2019

(65) Prior Publication Data

US 2021/0056864 A1 Feb. 25, 2021

(51) Int. Cl.
*G10H 1/00* (2006.01)
*G09B 15/00* (2006.01)

(52) U.S. Cl.
CPC ......... *G09B 15/002* (2013.01); *G10H 1/0008* (2013.01); *G10H 2220/106* (2013.01)

(58) Field of Classification Search
CPC .. G06F 3/04842; G06F 1/1692; G06F 1/1605; G10H 2220/015; G10H 2240/131; G10H 2220/011; G10H 2240/145; G10H 2220/091; G10H 2240/135; G10H 2240/141; G10H 2210/031; G10H 1/36; G10H 7/12; G10H 1/00; H04N 21/4334; H04N 21/4316; H04N 21/4345; H04N 5/232933; H04N 5/77; H04N 21/251; H04N 2201/3273; H04N 1/00352; H04N 1/00408; G09B 15/00; G09B 5/04; G06N 20/00; G10G 1/00; G10G 3/00; G10L 13/00; G10L 19/00
See application file for complete search history.

(56) References Cited

U.S. PATENT DOCUMENTS

| | | | |
|---|---|---|---|
| 2011/0259176 A1* | 10/2011 | Pillhofer | G09B 15/00 84/470 R |
| 2013/0276619 A1* | 10/2013 | Fujita | G10H 1/42 84/609 |
| 2015/0026577 A1* | 1/2015 | Story | G06F 3/04847 715/720 |
| 2015/0067496 A1* | 3/2015 | Missig | G06F 3/016 715/702 |
| 2015/0067512 A1* | 3/2015 | Roswell | G06F 3/04842 715/716 |
| 2017/0018262 A1* | 1/2017 | Pinuela Irrisarri | G10H 1/40 |
| 2018/0136828 A1* | 5/2018 | Threewits | G09B 19/003 |
| 2018/0262452 A1* | 9/2018 | Guthery | G06Q 10/10 |
| 2018/0349493 A1* | 12/2018 | Zhao | G10H 1/46 |
| 2020/0226947 A1* | 7/2020 | Fowlkes | A63F 13/814 |
| 2020/0327869 A1* | 10/2020 | Noguchi | G06F 3/04842 |

* cited by examiner

*Primary Examiner* — Marlon T Fletcher
(74) *Attorney, Agent, or Firm* — Daniel J. Chalker; Chalker Flores, LLP

(57) ABSTRACT

A method and device includes an input/output interface, a memory, and one or more processors communicably coupled to the input/output interface and the memory. The input/output interface includes a display and a speaker. A musical or linguistic work is selected via the input/output interface. A visual data and an audio data for the selected musical or linguistic work is retrieved from the memory or the input/output interface using the one or more processors. All or part of the visual data is displayed on the display. A portion of the displayed visual data is selected via the input/output interface. A portion of the audio data corresponding to the selected portion of the visual data is played using the speaker and the one or more processors.

30 Claims, 13 Drawing Sheets

LEARNING DEVICE AND METHOD

CROSS-REFERENCE TO RELATED APPLICATIONS

Not applicable.

STATEMENT OF FEDERALLY FUNDED RESEARCH

This application is not the subject of any federally sponsored research or development.

TECHNICAL FIELD OF THE INVENTION

The present invention relates in general to the field of education and training, and more particularly, to a learning device and method.

BACKGROUND OF THE INVENTION

Without limiting the scope of the invention, its background is described in connection with learning music and languages.

Music educators have long encountered a problem that plagues students and parents. Students currently do not have the tools to practice without errors when they go home. Students practice errors that become concrete and buried in their subconscious mind making it difficult to correct in the next lesson. The vast majority of music anthologies come with a companion audio with the intention of helping students practice both aurally and visually, but the two are currently disconnected.

Conventional learning tools and sources of instruction for learning music include music teachers, music books, method books, anthologies, compact disks (CDs), digital video disks (DVDs) and MP3 downloadable audio files. While each of these offers certain advantages, each also has limitations. The audio and written learning resources have the disadvantage of the quality of instruction and the manner in which the information is presented. Highly valued teachers are exceedingly limited in the amount of time spent with each student. For example, a music teacher provides a personally tailored lesson; however, the cost of the instruction is expensive and each session is limited not just in time but based on several factors. One of the main factors is the students' ability to retain information from lesson to lesson. The vast majority of private lessons are spent reviewing the previous material taught the previous week and depending on the student, material from several weeks prior. This is due, primarily, to the practice regimen not being consistent at home. They may have the desire to practice, or they may even be practicing but they are doing so incorrectly which actively makes them regress rather than progress. In addition, the majority of parents are not musicians themselves and do not have the knowledge or skill set to help their children practice their particular instrument. To develop proficiency, the student must devote many hours each week to practicing the assigned material individually. Music books provide a relatively low-cost alternative or adjunct to a music teacher. Most of the newer music books include companion audio in addition to the notated music and lessons, which will usually include some general instruction.

MP3 or compact disks combine recorded audio with instructional commentary and helpful "hints" for performance. Some audio includes songs and musical passages recorded both at a normal tempo and reduced tempo to make learning easier. With both MP3 and CDs however, looping or repeating a particular section of a song is cumbersome and difficult. The ability to stop a CD player, that is if you can still purchase a CD player, and go directly to that passage is very hard and slows down the learner. Not to mention the student is already frustrated with the problematic passage and now the audio intended to help him or her is complicating the learning process even further. In addition, if the songs and musical passages are not recorded at a reduced tempo then reducing the tempo using a conventional CD player is not possible. Moreover, CDs and MP3s do not provide any visual instruction or interaction, which makes it challenging for the student to develop a clear aural/visual understanding of the music.

Currently, most methods of language teaching are provided in the form of traditional textbooks that focus on teaching grammar and vocabulary. Although such textbooks provide a general knowledge of the structure of the new language, a major difficulty for the language learners is making use of this knowledge in real-life situations. Crucially, individuals do not learn their native languages by studying grammatical structures or memorizing lists of words, but by being exposed to language use in authentic communicative settings. Moreover, children learn their native languages orally, long before they start learning how to read. Therefore, purely text-based instructions are considered insufficient for gaining native-like mastery in a second language. Additionally, many second language learners do not have access to native-speaking teachers who can provide them with correct pronunciation and usage tips. Being exposed to incorrect or inaccurate instructions by non-native teachers can lead to fossilization of errors, which would be very difficult to correct later. Even when native-speaking teachers are available, the student's access to them is normally limited only to the classroom time. Since students do not have access to correct usage of what they have learned when they are outside of the classroom, it is very likely that they spend time practicing incorrect forms, which would require extended time and effort to correct. While some language textbooks try to resolve this problem by providing audio CDs or MP3 files of the texts spoken by native speakers, having the texts and the audio files in different mediums would make these audio files difficult or, in some situations, impossible to use.

SUMMARY OF THE INVENTION

The various embodiments of the invention disclosed herein provide a new and improved way for people to learn to play or sing music, and learn languages. The combination of audio, visual and sheet music enables people to associate the sounds with the notation, which enhances learning. Likewise, the combination of audio, visual and text enables people to associate the sounds with the words and/or musical notes, which enhances learning. This innovative and interactive learning software aids music students in proper and effective practice of a musical instrument and/or vocal studies.

In one embodiment, a device includes an input/output interface, a memory, and one or more processors communicably coupled to the input/output interface and the memory. The input/output interface includes a display and a speaker. A musical or linguistic work is selected via the input/output interface, and a visual data and an audio data for the selected musical or linguistic work is retrieved from the memory or the input/output interface using the one or more processors. All or part of the visual data is displayed on the display. A segment of the displayed visual data is selected via the input/output interface, and the segment of the audio data corresponding to the selected segment of the visual data is played using the speaker and the one or more processors.

In one aspect, the visual data comprises a musical score data for the musical work, and the visual data comprises a text, character, gesture, sign and/or symbol data for the linguistic work. In another aspect, the visual data and the audio data are stored together in one or more files or stored separately in the one or more files. In another aspect, a specified period of time is waited and the segment of the audio data corresponding to the selected segment of the musical score data is replayed using the speaker and the one or more processors. In another aspect, the specified period of time and a specified number of replays are selected via the input/output interface. In another aspect, a musical instrument, a vocal part, or a language is selected using the input/output interface, wherein the visual data and the audio data correspond to the selected musical instrument, the selected vocal part, or the selected language. In another aspect, an indication is provided on the display corresponding to the audio data being played using the one or more processors.

In another aspect, a user rendition of the selected segment of the visual is recorded using the input/output interface. In another aspect, the user rendition is compared to the audio data, an accuracy score for the user rendition is calculated, and the accuracy score is displayed on the display using the one or more processors. In another aspect, one or more suggestions to improve the accuracy score are provided on the display using the one or more processors. In another aspect, one or more errors in the user rendition are displayed or highlighted on the display using the one or more processors. In another aspect, a user visual data is created based on the user rendition and the rendition is displayed on the display using the one or more processors. In another aspect, any differences in the created visual data and the visual data are highlighted or visually indicated on the display using the one or more processors. In another aspect, an animation or video associated with the visual data is displayed on the display using the one or more processors.

In another embodiment, a method for musical or linguistic learning includes providing a device that includes an input/output interface, a memory and one or more processors communicably coupled to the input/output interface and the memory. The input/output interface includes at least a display and a speaker. A musical or linguistic work is selected via the input/output interface. A visual data and an audio data for the selected musical or linguistic work is retrieved from the memory or the input/output interface using the one or more processors. All or part of the visual data is displayed on the display. A segment of the displayed visual data is selected via the input/output interface. A segment of the audio data corresponding to the selected segment of the visual data is played using the speaker and the one or more processors. Optionally, a specified period of time is waited and the segment of the audio data corresponding to the selected segment of the visual data is replayed using the speaker and the one or more processors.

In one aspect, the visual data comprises a musical score data for the musical work, and the visual data comprises a text, character, gesture, sign and/or symbol data for the linguistic work. In another aspect, the visual data and the audio data are stored together in one or more files or stored separately in the one or more files. In another aspect, the method further comprises selecting the specified period of time and a specified number of replays via the input/output interface. In another aspect, the method further comprises selecting a musical instrument, a vocal part, or a language using the input/output interface, wherein the visual data and the audio data correspond to the selected musical instrument, the selected vocal part, or the selected language. In another aspect, the method further comprises providing an indication on the display corresponding to the audio data being played using the one or more processors.

In another aspect, the method further comprises recording a user rendition of the selected segment of the visual data using the input/output interface. In another aspect, the method further comprises comparing the user rendition to the audio data, calculating an accuracy score for the user rendition, and displaying the accuracy score on the display using the one or more processors. In another aspect, the method further comprises providing one or more suggestions to improve the accuracy score on the display using the one or more processors. In another aspect, the method further comprises displaying or highlighting one or more errors in the user rendition on the display using the one or more processors. In another aspect, the method further comprises creating a user visual data based on the user rendition and displaying the rendition on the display using the one or more processors. In another aspect, the method further comprises highlighting or visually indicating any differences in the user visual data and the visual data on the display using the one or more processors. In another aspect, the method further comprises displaying an animation or video associated with the musical work on the display using the one or more processors. In another aspect, the method further comprises performing the selected segment of the visual data by a user. In another aspect, performing the selected segment of the visual data by the user occurs after or in combination with playing the portion of the audio data corresponding to the selected portion of the visual data.

In one embodiment, the software can be used as a method of providing real-life examples of conversations in a second language in specific communicative contexts, along with the ability to repeat individual words, phrases and sentences. The text of a dialogue between two or more people in a specific situation (e.g., a conversation between a doctor and a patient, or between a bank teller and a customer) is presented on the display. A segment of the displayed text is selected via the input/output interface, and the segment of the audio data corresponding to the selected segment of the text is played using the speaker and the one or more processors. In one aspect, a specified period of time is waited and the segment of the audio data corresponding to the selected segment of the text is replayed using the speaker and the one or more processors. In another aspect, the specified period of time and a specified number of replays are selected via the input/output interface. In another aspect, a word, phrase or sentence is selected using the input/output interface, wherein the text data and the audio data correspond to the selected word, phrase or sentence. Instructional information or tips can also be displayed, including the author's recorded voice coaching on specific parts of the text or general usage points.

BRIEF DESCRIPTION OF THE DRAWINGS

For a more complete understanding of the features and advantages of the present invention, reference is now made to the detailed description of the invention along with the accompanying figures in which:

FIGS. 2A-2D are images of screens highlighting various features of one embodiment of the present invention;

DETAILED DESCRIPTION OF THE INVENTION

Illustrative embodiments of the system of the present application are described below. In the interest of clarity, not all features of an actual implementation are described in this specification. It will, of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices and systems are depicted in the attached drawings. However, as will be recognized by those skilled in the art after a complete reading of the present application, the devices, systems, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices and systems described herein may be oriented in any desired direction.

Figure 1:
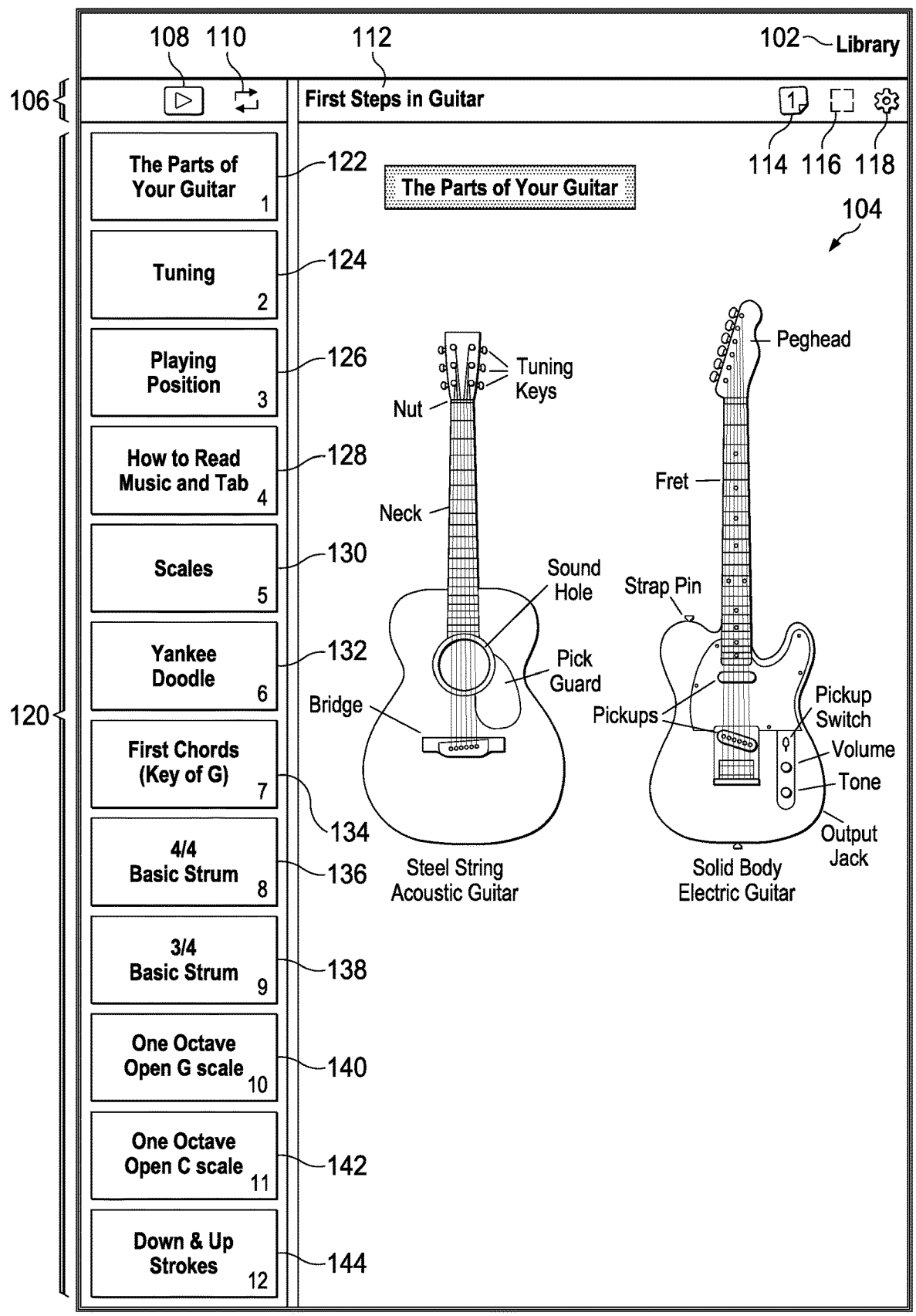
FIG. 1 is an image of a screen displayed in accordance with one embodiment of the present invention.

Now referring to FIG. 1, an image of a screen displayed in accordance with one embodiment of the present invention is shown. The functions described herein pertain to the embodiment shown, but those skilled in the art will recognize that many other functions can be integrated in the present invention. Some of these other functions will be described below. The embodiment shown is displayed on an electronic tablet. However, any mobile communications device or computing device can be used, such as a mobile phone, laptop computer, desktop computer, smart TV, smart glasses, gaming device, etc. The present invention is compatible with any general platform, mac, pc, Android, iPhone, etc. Although a connection to the Internet via the input/output interface is preferred, some embodiments may to require such a connection. The input/output interface can be any combination of touch display, keyboard, mouse, voice control, motion control, a wired communications interface, a wireless communications interfaces, or other way to receive data/commands or provide data/information to a user.

A musical work can be selected from the Library button 102. The musical work can be a single musical work, a set of musical works, an education or training program, or other compilation. Moreover, the musical work can be all or part of a complete musical work (e.g., song, chant, instrumental, etc.). In this embodiment, the musical work is a guitar training program. The musical work can be stored locally in memory or a storage medium, or remotely (e.g., a server accessible via a wireless connection, etc.). Once selected, information about the musical work will be displayed in the main display area 104, such images of guitars identifying the various parts of the guitar. In other embodiments, the main display area 104 may include a title, author, copyright information, graphics, etc. An action or function bar 106 includes a play/pause button 108, a loop button 110, an information area 112, a location icon 114, a full screen icon 116 and a settings button 118. Other buttons, icons and information can be displayed. If the selected work is divided into parts, chapters, lessons, tasks, etc., they will be displayed in the navigation bar 120. In this example, the name of the musical work "First Steps in Guitar" is displayed in the information area 112 and the current location "1" within the navigation bar 120 is displayed in the location icon 114. The navigation bar 120 includes buttons that allow the user to jump to a specific location within the musical work. In this example, the navigation buttons include "The Parts of Your Guitar" 122, "Tuning" 124, "Playing Position" 126, "How to Read Music and Tab" 128, "Scales" 130, "Yankee Doodle" 132, "First Chords (Key of G)" 134, "4/4 Basic Strum" 136, "3/4 Basic Strum" 138, "One Octave Open G Scale" 140, "One Octave Open C Scale" 142, and "Down & Up Strokes" 144.

Figure 2A:
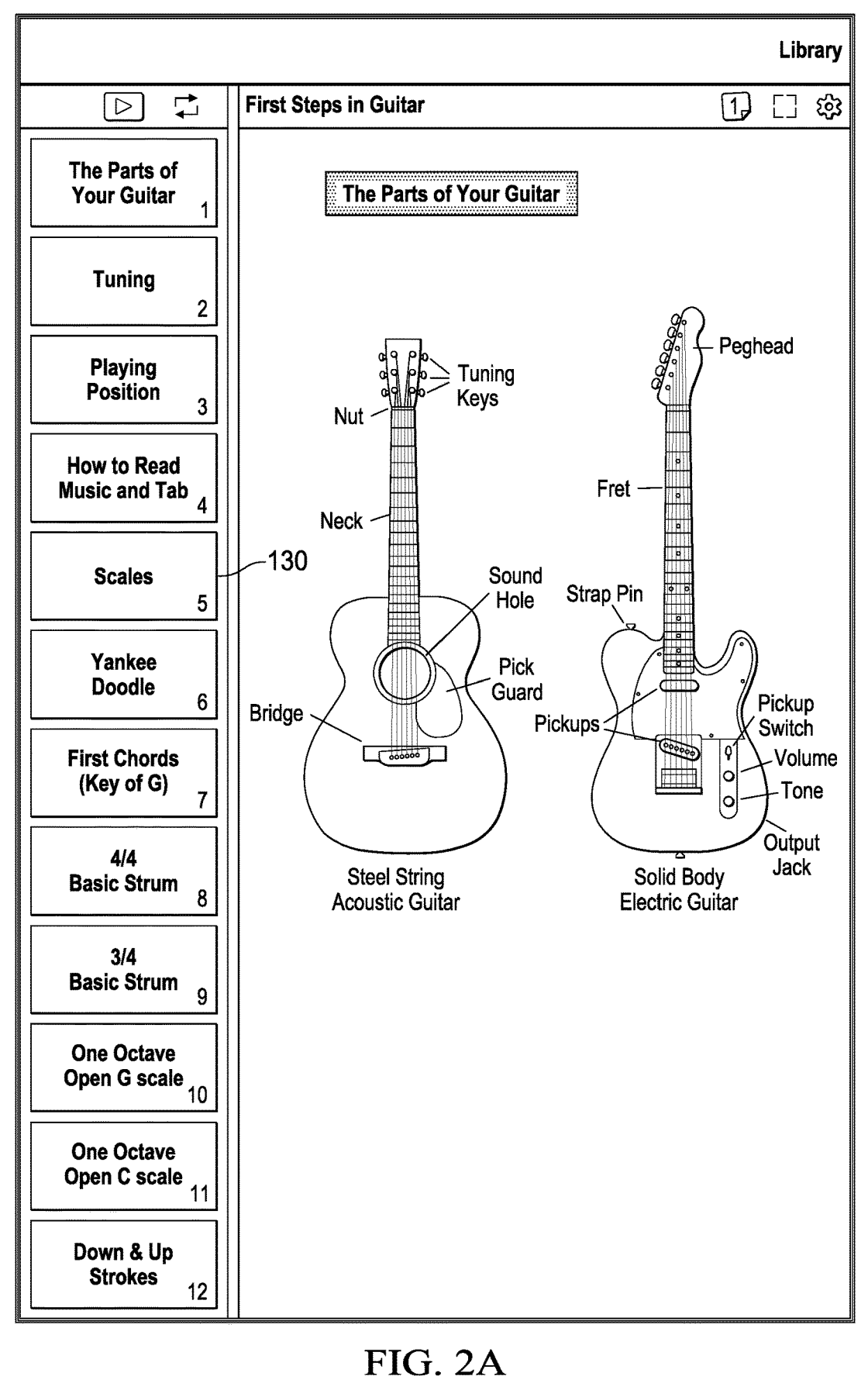
Figure 2B:
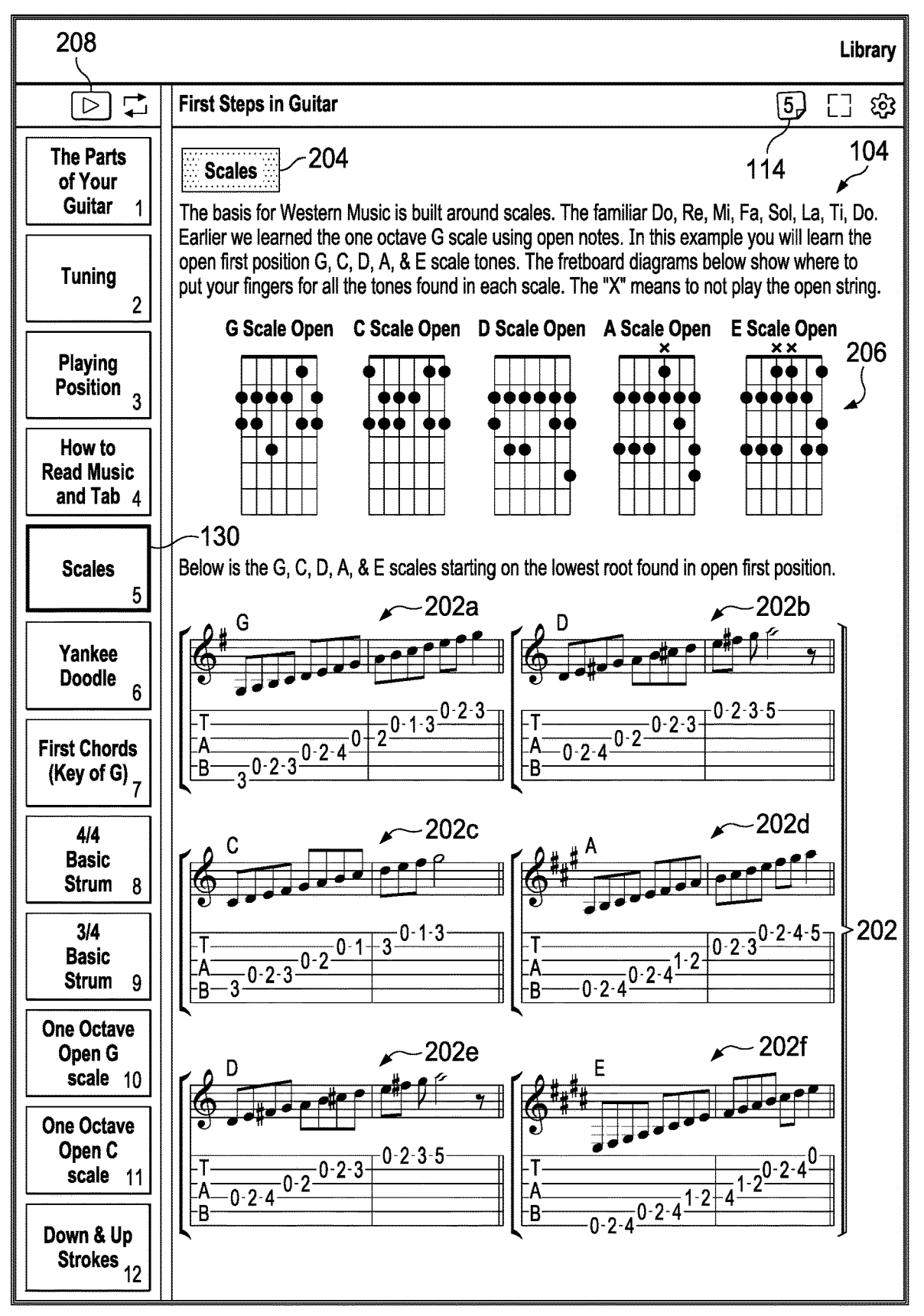
Figure 2C:
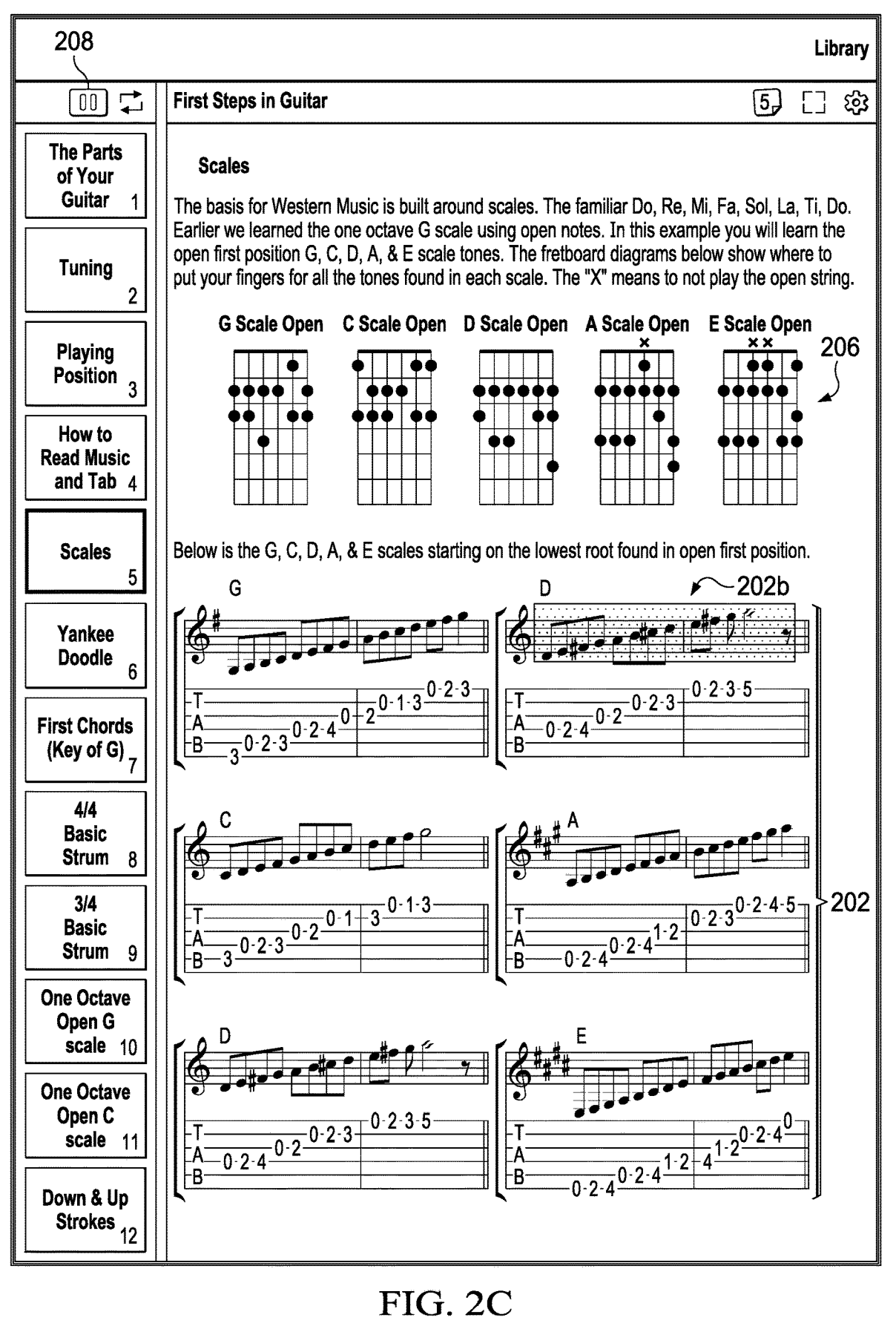
Figure 2D:
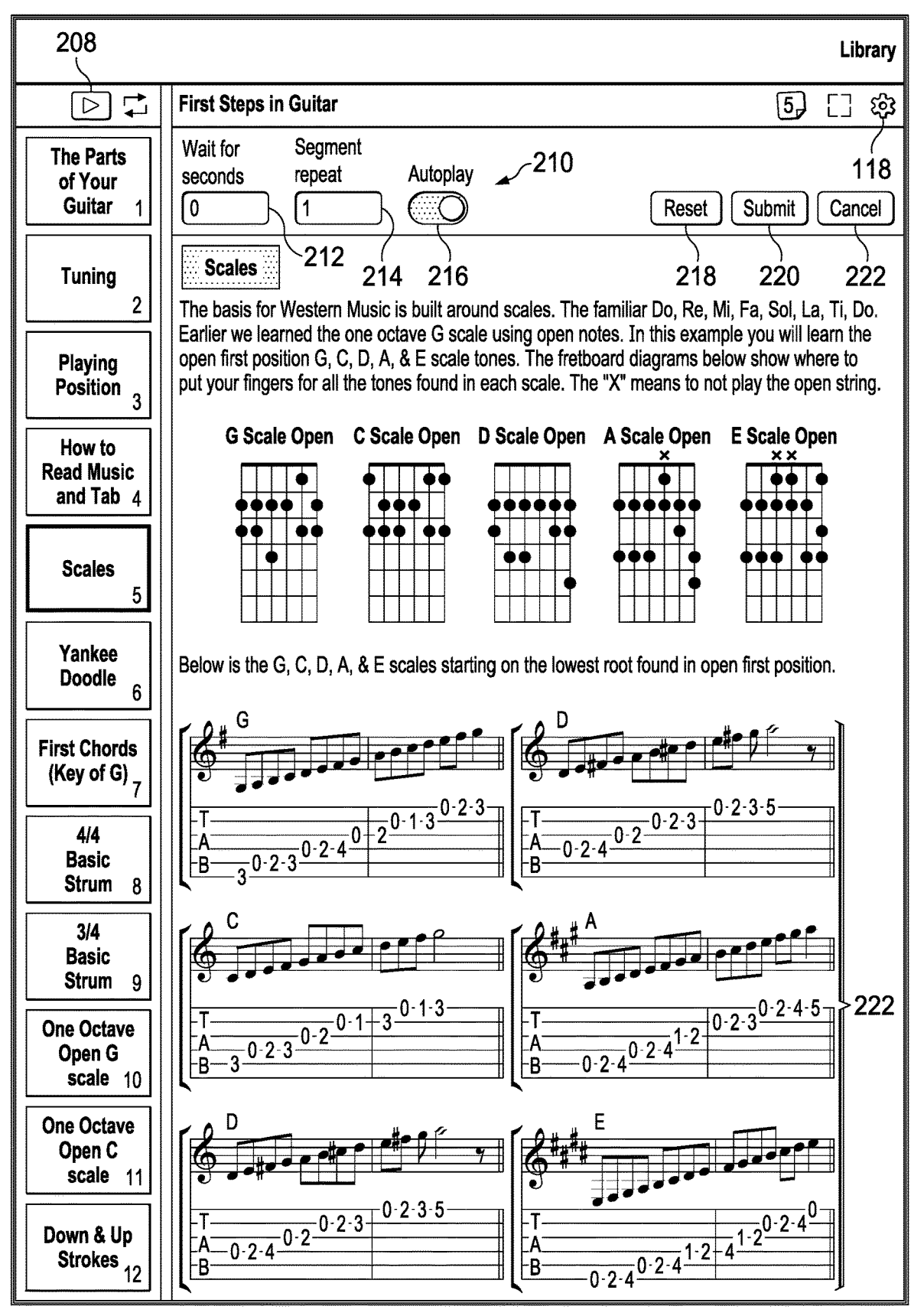

Referring now to FIGS. 2A-2D, images of screens highlighting various features of one embodiment of the present invention are shown. The navigation button 130 for the "Scales" is selected in FIG. 2A. The musical score data 202 is displayed in the main display area 104, the navigation button 130 "Scales" is highlighted, and the current location "5" is displayed in the location icon 114 in FIG. 2B. Musical information 204 and graphics or video 206, which can be interactive or animated, are also displayed in the main display area 104. Instructional information or tips can also be displayed, including the author's recorded voice coaching on the difficult sections of the music. For example, information about "Scales" is displayed along with fretboard diagrams for the tones in each scale. In this case, the musical score data 202 includes a musical score and a tablature (TAB). In other embodiments, the musical score data 202 may include lyrics. The musical score 202 can be segmented into segments, phrases or portions to assist in the learning or training process (e.g., segments 202a, 202b, 202c, 202d, 202e and 202f). The user can select one of the segments or select their own portion of the musical score 202. In this example, the user selects score segment 202b, which is highlighted while playing, as shown in FIG. 2C. The play button 108 switches to a pause button when the musical selection is being played, and switches back to a play button when the musical selection if paused. As shown in FIG. 2D, a settings bar 210 is displayed when the settings button 118 is selected. The settings bar 210 includes a delay data box 212 "Wait for seconds", a number of repetitions data box 214 "Segment repeat", an autoplay on/off slide button 216, a reset button 218, a submit button 220, and a cancel button 222.

Students can select any phrase they would like to play and echo back, similar to modeling provided by their teacher. The selected phrase will be played and a custom pause time will be observed giving the user time to echo it back on their instrument or voice. This creates call and response learning.

The user can customize the number of repetitions and the seconds in between each phrase.

Although not required, it is preferred that all recordings are actual voice and/or instruments, which conveys artistry and serves as a correct model of musical tone production (no synthesized or midi sounds are used). As a result, students can hear the actual audio, not a Midi sound, by the performer and visually see the musical phrases on the sheet music. This option of repetition can be used as many times as they want. This helps students easily associate the written notation or a written melody to the sound, reinforcing what is taught in private lessons or music class/band/choir/orchestra.

The present invention complements what educators do in the classroom or studio, and serves as a companion aid for students at home, and helpful new resources for teachers. The student's practice time can be reported, which adds accountability for teachers and parents. Moreover, in some embodiments, the student's performances can be recorded, which adds accountability for teachers and parents. The present invention can be used any instrument, voice, or language. Existing books, CDs, or MP3s can be easily converted utilizing the resources already invested to create these media. In some embodiments, the present invention can be used in a game mode were individuals compete against one another locally or via an Internet connection.

Figure 3:
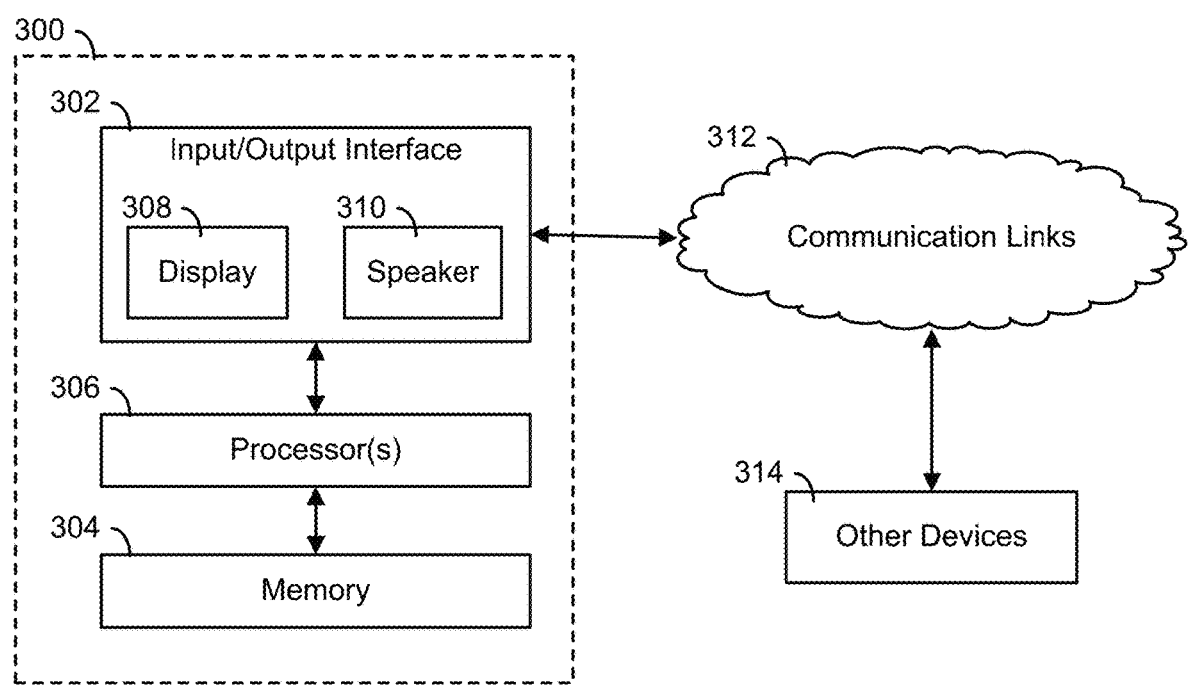
FIG. 3 is a block diagram of an apparatus in accordance with one embodiment of the present invention.

Now referring to FIG. 3, a block diagram of a device 300 in accordance with one embodiment of the present invention is shown. The device 300 can be an electronic tablet, a mobile phone, a laptop computer, a desktop computer, a smart TV, a smart glasses, a gaming device, or any other device capable of performing the functions described herein. The device 300 includes an input/output interface 302, a memory 304, and one or more processors 306 communicably coupled to the input/output interface 302 and the memory 304. Note that the device 300 may include other components not specifically described herein. The memory 304 can be local, remote or distributed. Likewise, the one or more processors 306 can be local, remote or distributed. The input/output interface 302 includes a display 308 and a speaker 310. The input/output interface 302 can be any mechanism for facilitating the input and/or output of information (e.g., touch display, keyboard, mouse, voice control, motion control, a wired communications interface, a wireless communications interfaces, or other way to receive data/commands or provide data/information to a user, etc.) Moreover, the input/output interface 302 can be a remote device communicably coupled to the one or more processors 306 via one or more communication links 312 (e.g., network(s), cable(s), wireless, satellite, etc.). The one or more communication links 312 can communicably couple the device 300 to other devices 314 (e.g., databases, servers, other similar devices of students, teachers and/or performers, etc.). A musical work is selected via the input/output interface 302, and a musical score data and an audio data for the selected musical work is retrieved from the memory 304 or the input/output interface 302 using the one or more processors 306. All or part of the musical score data is displayed on the display 308. A segment of the displayed musical score data is selected via the input/output interface 302, and the segment of the audio data corresponding to the selected segment of the musical score data is played using the speaker 310 and the one or more processors 306.

In one aspect, the visual data comprises a musical score data for the musical work, and the visual data comprises a text, character, gesture, sign and/or symbol data for the linguistic work. In another aspect, the visual data and the audio data are stored together in one or more files or stored separately in the one or more files. In another aspect, a specified period of time is waited and the segment of the audio data corresponding to the selected segment of the visual data is replayed using the speaker 310 and the one or more processors 306. In another aspect, the specified period of time and a specified number of replays are selected via the input/output interface 302. In another aspect, a musical instrument, a vocal part or a language is selected using the input/output interface 302, wherein the visual data and the audio data correspond to the selected musical instrument, the selected vocal part, or the selected language. In another aspect, an indication is provided on the display 308 corresponding to the audio data being played using the one or more processors 306.

In another aspect, a user rendition of the selected segment of the musical score is recorded using the input/output interface 302. In another aspect, the user rendition is compared to the audio data, an accuracy score for the user rendition is calculated, and the accuracy score is displayed on the display 308 using the one or more processors 306. In another aspect, one or more suggestions to improve the accuracy score are provided on the display 308 using the one or more processors 306. In another aspect, one or more errors in the user rendition are displayed or highlighted on the display 308 using the one or more processors 306. In another aspect, a user visual data is created based on the user rendition and the rendition is displayed on the display 308 using the one or more processors 306. In another aspect, any differences in the user visual data and the musical score are highlighted or visually indicated on the display 308 using the one or more processors 306. In another aspect, an animation or video associated with the visual data is displayed on the display 308 using the one or more processors 306.

Figure 4A:
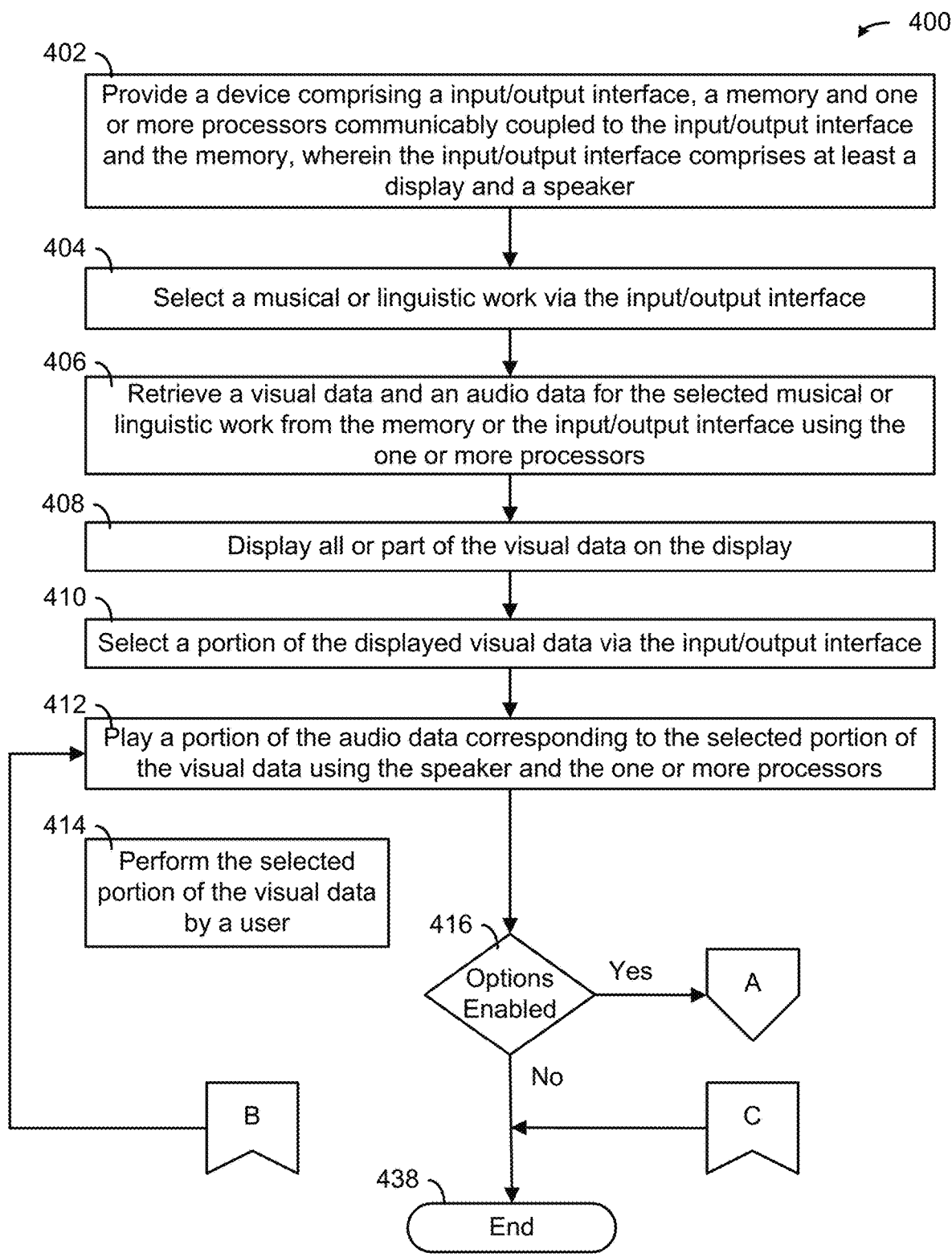
FIGS. 4A-4B are flow chart of a method in accordance with one embodiment of the present invention.
Figure 4B:
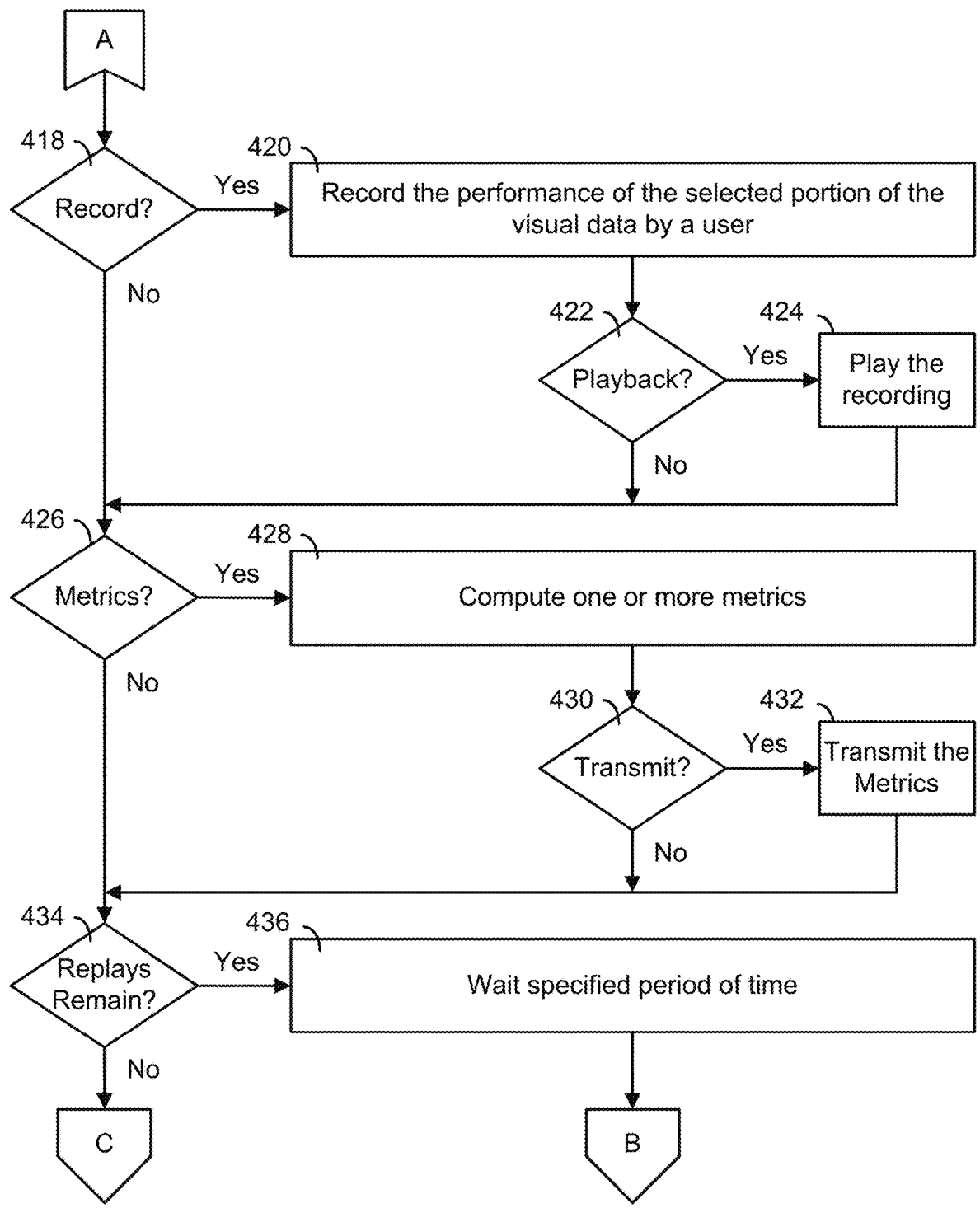

Referring now to FIGS. 4A-4B, flow charts 400 of a method in accordance with one embodiment of the present invention is shown. A device includes an input/output interface, a memory and one or more processors communicably coupled to the input/output interface and the memory is provided in block 402. The input/output interface includes at least a display and a speaker. A musical or linguistic work is selected via the input/output interface in block 404. A visual data and an audio data for the selected musical or linguistic work is retrieved from the memory or the input/output interface using the one or more processors in block 406. All or part of the visual data is displayed on the display in block 408. A segment of the displayed visual data is selected via the input/output interface in block 410. A segment of the audio data corresponding to the selected segment of the visual data is played using the speaker and the one or more processors in block 412. At this point, the user will play, sing, speak, write or otherwise perform the selected segment of the visual data in block 414. Alternatively, the user can attempt to play, sing, speak, write or otherwise perform the selected segment of the visual data simultaneously with the playing of the selected segment in block 412, which can assist the user in performing the correct timing, rhythm, tone or pitch of the selected segment of the visual data. A user or the user's teacher may select various options or features to assist in the learning process. Default selections for the various options or features may also be used.

If any options or features are selected or enabled, as determined in decision block 416, the process will perform the options or features as illustrated in FIG. 4B. The invention is not limited to the options or features shown, or the order in which they are shown. If a record option is selected, as determined in decision block 418, the performance of the selected portion of the visual data by the user is recorded in block 420. Note that this option would be performed prior to or concurrently with the user's performance in block 414. If a playback option is selected, as determined in decision block 422, the recording is played in block 424. If the playback option is not selected, as determined in decision block 422, or the after the recording has been played in block 424, or the record option is not selected, as determined in decision block 418, the next option is evaluated. If a metrics option is selected, as determined in decision block 426, the one or more metrics are computed in block 428. The metrics can include, but is not limited to, any data regarding the use by the user (e.g., identification, time began, selections, repetitions, time end, etc.), or analysis of the user's performance (e.g., accuracy, automated critic, automated suggestions, etc.). Any other type of data or analytics can be used. If the metrics are to be transmitted to a server, teacher or other device, as determined in decision block 430, the metrics are transmitted in block 432. If the transmit option is not selected, as determined in decision block 430, or the after the metrics have been transmitted in block 432, or the metrics option is not selected, as determined in decision block 426, the next option is evaluated. If the replay option has been selected and there are replays left to be played, as determined in decision block 434, a specified period of time is waiting in block 436, the segment of the audio data corresponding to the selected segment of the visual data is replayed using the speaker and the one or more processors in block 412, and the process continues as described. Alternatively, the device can wait for the user to play, sing, speak, write or otherwise perform the selected segment of the visual data using audio sensors (e.g., microphone, etc.) and/or visual sensors (e.g., camera, etc.) before automatically replaying the selected segment of the visual data in block 412. If the replay option has not been selected or there are no replays left, as determined in decision block 434, or no options are enabled, as determined in decision block 416, the process ends in block 438. Note that in some cases, some steps can be reordered, altered or eliminated. Moreover, other steps can be added.

In one aspect, the visual data comprises a musical score data for the musical work, and the visual data comprises a text, character, gesture, sign and/or symbol data for the linguistic work. In another aspect, the visual data and the audio data are stored together in one or more files or stored separately in the one or more files. In another aspect, the method further comprises selecting the specified period of time and a specified number of replays via the input/output interface. In another aspect, the method further comprises selecting a musical instrument, a vocal part, or a language using the input/output interface, wherein the visual data and the audio data correspond to the selected musical instrument, the selected vocal part, or the selected language. In another aspect, the method further comprises providing an indication on the display corresponding to the audio data being played using the one or more processors.

In another aspect, the method further comprises recording a user rendition of the selected segment of the musical score using the input/output interface. In another aspect, the method further comprises comparing the user rendition to the audio data, calculating an accuracy score for the user rendition, and displaying the accuracy score on the display using the one or more processors. In another aspect, the method further comprises providing one or more suggestions to improve the accuracy score on the display using the one or more processors. In another aspect, the method further comprises displaying or highlighting one or more errors in the user rendition on the display using the one or more processors. In another aspect, the method further comprises creating a user visual data based on the user rendition and displaying the rendition on the display using the one or more processors. In another aspect, the method further comprises highlighting or visually indicating any differences in the user visual data and the visual data on the display using the one or more processors. In another aspect, the method further comprises displaying an animation or video associated with the musical work on the display using the one or more processors. In another aspect, the method further comprises performing the selected segment of the visual data by a user. In another aspect, performing the selected segment of the visual data by the user occurs after or in combination with playing the portion of the audio data corresponding to the selected portion of the visual data.

Figure 5:
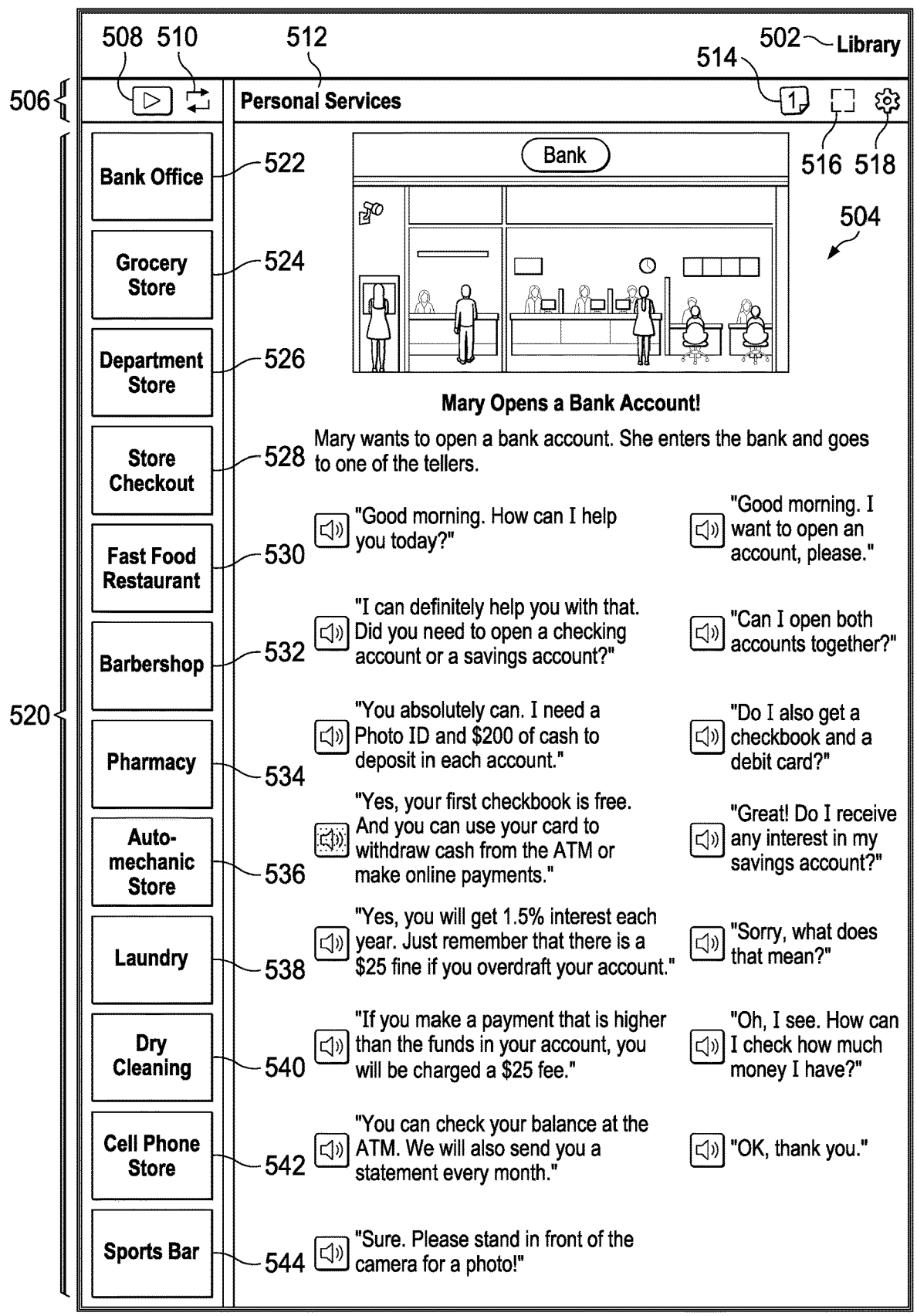
FIG. 5 is an image of a screen displayed in accordance with one embodiment of the present invention.

Now referring to FIG. 5, an image of a screen displayed in accordance with one embodiment of the present invention is shown. The software can be used as a method of providing real-life examples of conversations in a second language in specific communicative contexts, along with the ability to repeat individual words, phrases and sentences. The text of a dialogue between two or more people in a specific situation (e.g., a conversation between a doctor and a patient, or between a bank teller and a customer) is presented on the display. A segment of the displayed text is selected via the input/output interface, and the segment of the audio data corresponding to the selected segment of the text is played using the speaker and the one or more processors. In one aspect, a specified period of time is waited and the segment of the audio data corresponding to the selected segment of the text is replayed using the speaker and the one or more processors. In another aspect, the specified period of time and a specified number of replays are selected via the input/output interface. In another aspect, a word, phrase or sentence is selected using the input/output interface, wherein the text data and the audio data correspond to the selected word, phrase or sentence. Instructional information or tips can also be displayed, including the author's recorded voice coaching on specific parts of the text or general usage points.

More specifically, a lesson can be selected from the Library button 502. Once selected, information about the lesson will be displayed in the main display area 504, such as a title, author, copyright information, graphics, etc. An action or function bar 506 includes a play/pause button 508, a loop segment button 510, an information area 512, a location icon 514, a full screen icon 516 and a settings button 518. Other buttons, icons and information can be displayed. If the selected work is divided into parts, chapters, lessons, tasks, etc., they will be displayed in the navigation bar 520. In this example, the name of the lesson "Personal Services" is displayed in the information area 512 and the current location "1" within the navigation bar 520 is displayed in the location icon 514. The navigation bar 520 includes buttons that allow the user to jump to a specific location within the dialogues. In this example, the navigation buttons include "Bank Office" 522, "Grocery Store" 524, "Department Store" 526, "Store Checkout" 528, "Fast Food Restaurant" 530, "Barbershop" 532, "Pharmacy" 534, "Auto-mechanic Store" 536, "Laundry" 538, "Dry Cleaning" 540, "Cell Phone Store" 542, and "Sports Bar" 544.

Figure 6A:
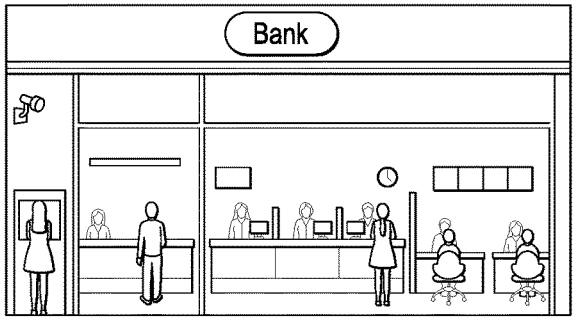
FIGS. 6A-6D are images of screens highlighting various features of one embodiment of the present invention.
Figure 6B:
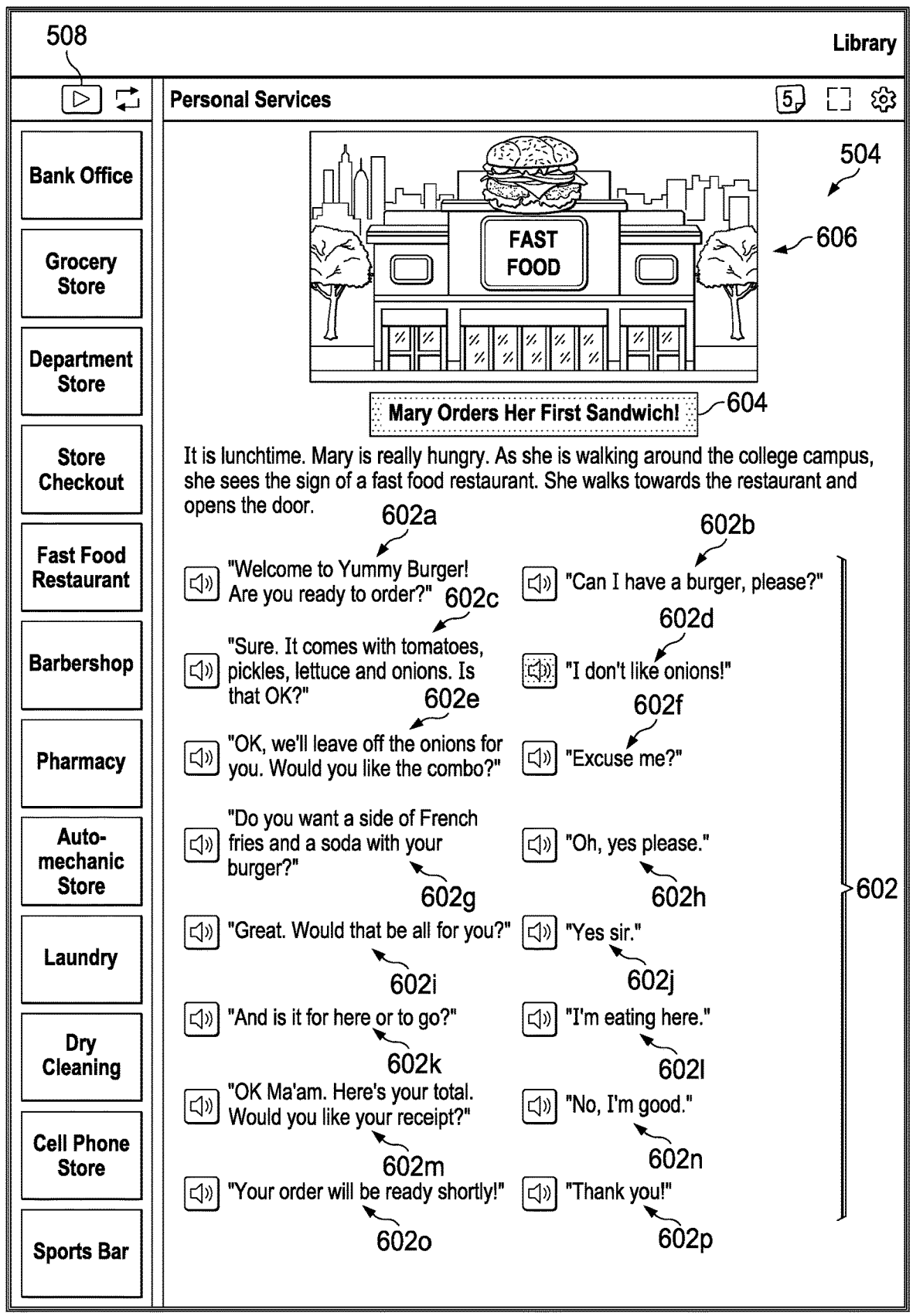
Figure 6C:
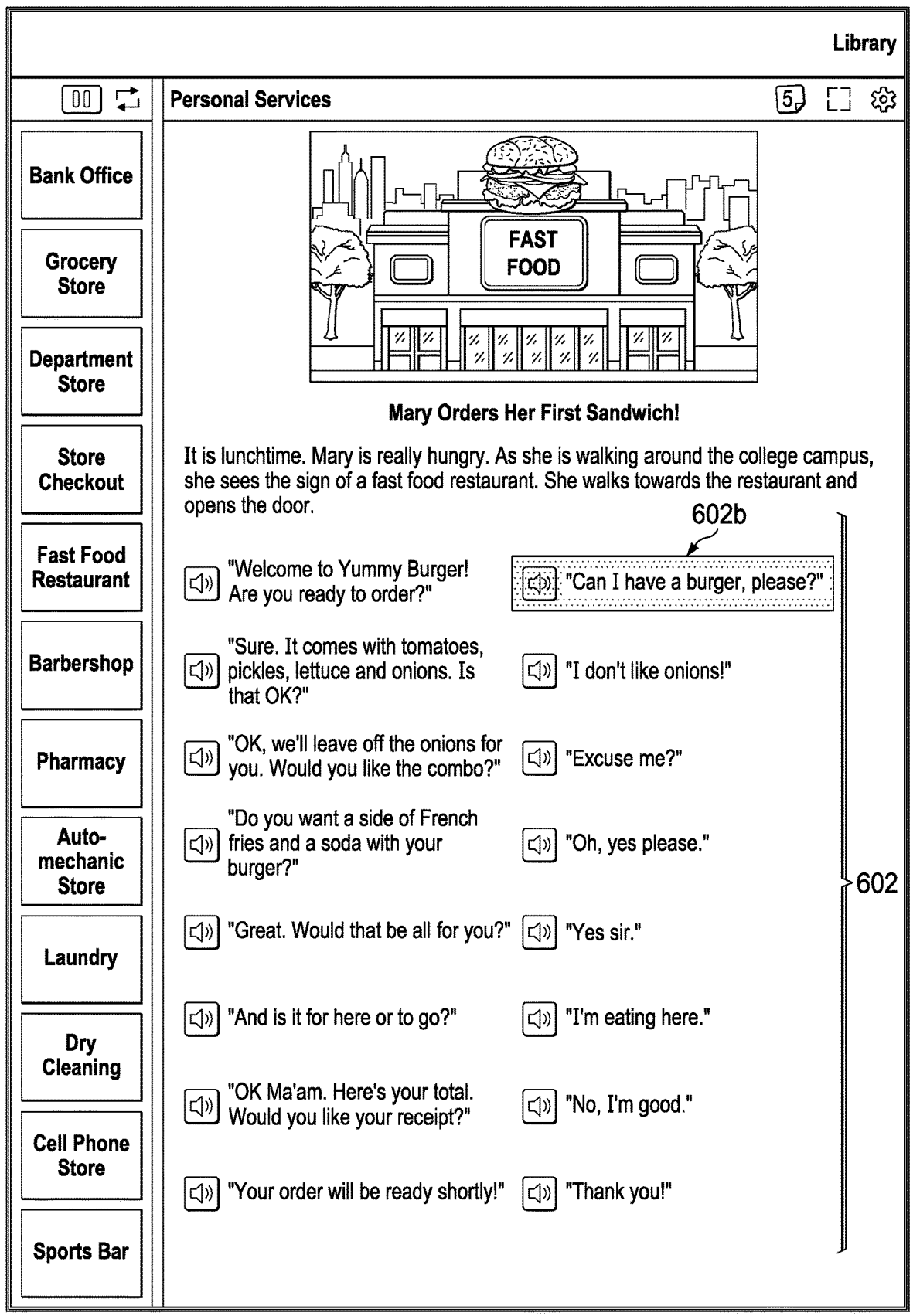
Figure 6D:
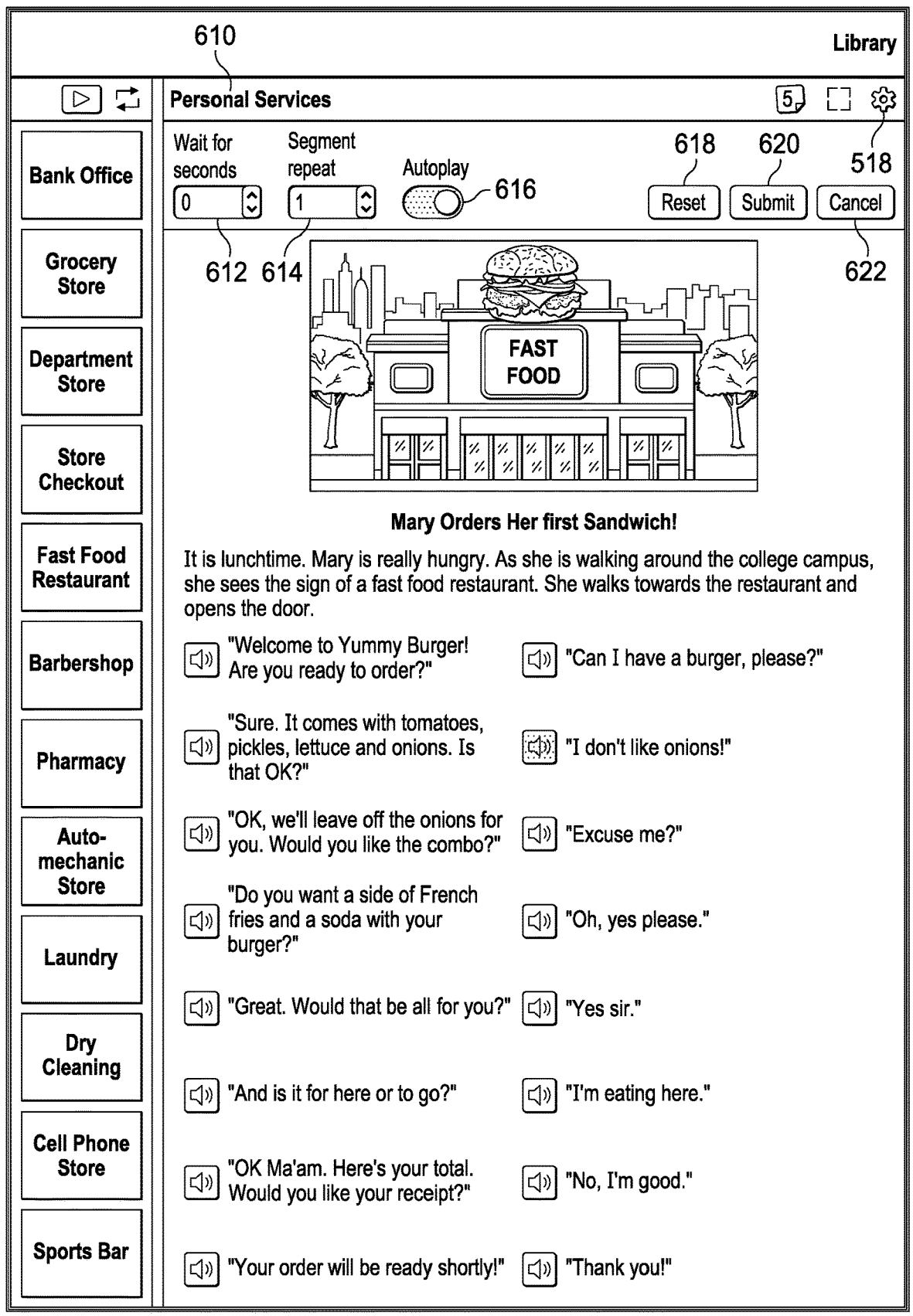

Referring now to FIGS. 6A-6D, images of screens highlighting various features of one embodiment of the present invention are shown. The navigation button 530 for the "Fast Food Restaurant" is selected in FIG. 6A. The dialogue text 602 is displayed in the main display area 504, the navigation button 530 "Fast Food Restaurant" is highlighted, and the current location "5" is displayed in the location icon 514 in FIG. 6B. Dialogue information 604 and graphics or video 606, which can be interactive or animated, are also displayed in the main display area 504. Instructional information or tips can also be displayed, including the author's recorded voice coaching on the difficult sections or important usage points in the dialogue. The dialogue text 602 can be segmented into words, phrases or sentences to assist in the learning or training process (e.g., segments 602a, 602b, 602c, 602d, 602e, 602f, 602g, 602h, 602i, 602j, 602k, 602l, 602m, 602n, 602o and 602p). The user can select one of the segments. In this example, the user selects segment 602b, which is highlighted while playing, as shown in FIG. 6C. The play button 508 is used to play the selected segment 602b of the dialogue text 602. The play button 508 switches to a pause button when the selected segment of the dialogue is being played. As shown in FIG. 6D, a settings bar 610 is displayed when the settings button 518 is selected. The settings bar 610 includes a delay data box 612 "Wait for seconds", a number of repetitions data box 614 "Segment repeat", an autoplay on/off slide button 616, a reset button 618, a submit button 620, and a cancel button 622.

Students can select any word, phrase or sentence they would like to play and echo back, similar to modeling provided by their teacher. The selected segment will be played and a custom pause time will be observed giving the user time to echo it back. This creates call and response learning. The user can customize the number of repetitions and the seconds in between each phrase.

The embodiment shown in FIGS. 5 and 6A-6D can be implemented with the device of FIG. 3 and the method of FIG. 4.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device or system, the method being employed to determine the value, or the variation that exists among the fastener subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process step(s), or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial," or "substantially," refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices, systems and/or methods disclosed and claimed herein can be made and executed without undue experimentation in light of the present disclosure. While the devices, systems and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method for musical or linguistic learning comprising:
providing a device comprising an input/output interface, a memory and one or more processors communicably coupled to the input/output interface and the memory, wherein the input/output interface comprises at least a display and a speaker;
selecting a musical or linguistic work via the input/output interface;
retrieving a visual data, an audio data and an animation or video for the selected musical or linguistic work from the memory or the input/output interface using the one or more processors;
displaying an action/function bar and a navigation bar on the display, wherein the action/function bar comprises a delay data box, a number of repetitions data box and an autoplay button;
selecting a portion of the musical or linguistic work using the navigation bar;
displaying a part of the visual data corresponding to the selected portion of the musical or linguistic work on the display;
selecting a portion of the displayed visual data via the input/output interface;
providing an indication on the display corresponding to the selected portion of the visual data using the one or more processors; and
playing a portion of the audio data and a portion of the animation or video corresponding to the selected portion of the visual data using the speaker, the display and the one or more processors.

2. The method of claim 1, wherein:
the visual data comprises a musical score data for the musical work; and
the visual data comprises a text, character, gesture, sign and/or symbol data for the linguistic work.

3. The method of claim 1, wherein the visual data and the audio data are stored together in one or more files or stored separately in the one or more files.

4. The method of claim 1, further comprising waiting a specified period of time and replaying the portion of the audio data corresponding to the selected portion of the visual data using the delay data box, the number of repetitions data box, the autoplay button, the speaker and the one or more processors.

5. The method of claim 4, further comprising selecting the specified period of time and a specified number of replays via the input/output interface, the delay data box and the number of repetitions data box.

6. The method of claim 1, further comprising selecting a musical instrument, a vocal part or a language using the input/output interface, wherein the visual data and the audio data correspond to the selected musical instrument, the selected vocal part, or the selected language.

7. The method of claim 1, further comprising providing the indication on the display corresponding to the audio data being played using the one or more processors.

8. The method of claim 1, further comprising recording a user rendition of the selected portion of the visual data using the input/output interface.

9. The method of claim 8, further comprising comparing the user rendition to the audio data, calculating an accuracy score for the user rendition, and displaying the accuracy score on the display using the one or more processors.

10. The method of claim 9, further comprising providing one or more suggestions to improve the accuracy score on the display using the one or more processors.

11. The method of claim 9, further comprising displaying or highlighting one or more errors in the user rendition on the display using the one or more processors.

12. The method of claim 8, further comprising creating a user visual data based on the user rendition and displaying the user visual data on the display using the one or more processors.

13. The method of claim 12, further comprising highlighting or visually indicating any differences in the user visual data and the visual data on the display using the one or more processors.

14. The method of claim 1, further comprising performing the selected segment of the visual data by a user.

15. The method of claim 14, wherein performing the selected segment of the visual data by the user occurs after or in combination with playing the portion of the audio data corresponding to the selected portion of the visual data.

16. A device comprising:
an input/output interface comprising at least a display and a speaker;
a memory;
one or more processors communicably coupled to the input/output interface and the memory; and
wherein a musical or linguistic work is selected via the input/output interface, a visual data, an audio data and an animation or video for the selected musical or linguistic work is retrieved from the memory or the input/output interface using the one or more processors, an action/function bar and a navigation bar are displayed on the display, wherein the action/function bar comprises a delay data box, a number of repetitions data box and an autoplay button, a portion of the musical or linguistic work is selected using the navigation bar, a part of the visual data corresponding to the selected portion of the musical or linguistic work is displayed on the display, a portion of the displayed visual data is selected via the input/output interface, an indication is provided on the display corresponding to the selected portion of the visual data using the one or more processors, and a portion of the audio data and a portion of the animation or video corresponding to the selected portion of the visual data is played using the speaker and the one or more processors.

17. The device of claim 16 wherein:
the visual data comprises a musical score data for the musical work; and
the visual data comprises a text, character, gesture, sign and/or symbol data for the linguistic work.

18. The device of claim 16 wherein the visual data and the audio data are stored together in one or more files or stored separately in the one or more files.

19. The device of claim 16, wherein a specified period of time is waited and the portion of the audio data corresponding to the selected portion of the visual data is replayed using the delay data box, the number of repetitions data box, the autoplay button, the speaker and the one or more processors.

20. The device of claim 19, wherein the specified period of time and a specified number of replays are selected via the input/output interface, the delay data box and the number of repetitions data box.

21. The device of claim 16, wherein a musical instrument, a vocal part, or a language is selected using the input/output interface, and the visual data and the audio data correspond to the selected musical instrument, the selected vocal part, or the selected language.

22. The device of claim 16, wherein the indication is provided on the display corresponding to the audio data being played using the one or more processors.

23. The device of claim 16, wherein a user rendition of the selected portion of the visual data is recorded using the input/output interface.

24. The device of claim 23, wherein the user rendition is compared to the audio data, an accuracy score for the user rendition is calculated, and the accuracy score is displayed on the display using the one or more processors.

25. The device of claim 24, wherein one or more suggestions to improve the accuracy score are provided on the display using the one or more processors.

26. The device of claim 24, wherein one or more errors in the user rendition are displayed or highlighted on the display using the one or more processors.

27. The device of claim 23, wherein a user visual data is created based on the user rendition and the user visual data is displayed on the display using the one or more processors.

28. The device of claim 23, wherein any differences in the user video data and the visual data are highlighted or visually indicated on the display using the one or more processors.

29. The device of claim 16, wherein the device comprises an electronic tablet, a mobile phone, a laptop computer, a desktop computer, a smart TV, a smart glasses, or a gaming device.

30. The device of claim 16, wherein the input/output interface further comprises a touch display, a keyboard, a mouse, a voice control, a motion control, a wired communications interface, or a wireless communications interface.

* * * * *